United States Patent [19]

Kray et al.

[11] Patent Number: 5,435,694

[45] Date of Patent: Jul. 25, 1995

[54] STRESS RELIEVING MOUNT FOR AN AXIAL BLADE

[75] Inventors: Nicholas J. Kray, Cincinnati; Andrew J. Lammas, Maineville; Richard J. Fallon, West Chester, all of Ohio

[73] Assignee: General Electric Company, Cincinnati, Ohio

[21] Appl. No.: 155,967

[22] Filed: Nov. 19, 1993

[51] Int. Cl.⁶ ............................................. F01D 5/30
[52] U.S. Cl. ................................ 416/219 R; 416/239
[58] Field of Search ............. 416/219 R, 220 R, 239, 416/240

[56] References Cited

U.S. PATENT DOCUMENTS

| | | | |
|---|---|---|---|
| 927,093 | 7/1909 | Barton | 416/219 |
| 2,658,718 | 11/1953 | Walker. | |
| 2,729,422 | 1/1956 | Scharf | 416/219 |
| 3,719,431 | 3/1973 | Steele et al. | |
| 3,871,791 | 3/1975 | Guy et al. | |
| 3,890,062 | 6/1975 | Hendrix et al. | |
| 3,891,351 | 6/1975 | Norbut. | |
| 4,019,832 | 4/1977 | Salemme et al. | |
| 4,050,850 | 9/1977 | Beckershoff | 416/219 |
| 4,084,922 | 4/1978 | Glenn. | |
| 4,171,930 | 10/1979 | Brisken et al. | |
| 4,314,794 | 2/1982 | Holden et al. | |
| 4,471,008 | 9/1984 | Huther | 416/219 |
| 4,480,957 | 11/1984 | Patel et al. | |
| 4,595,340 | 6/1986 | Klassen et al. | |
| 4,936,749 | 6/1990 | Arrao et al. | |
| 4,940,389 | 7/1990 | Luxenburger | 416/220 |
| 5,135,354 | 8/1992 | Novotny. | |
| 5,169,289 | 12/1992 | Lalanne. | |
| 5,275,536 | 1/1994 | Stephens et al. | 416/248 |
| 5,302,085 | 4/1994 | Dietz et al. | 416/248 |

FOREIGN PATENT DOCUMENTS

| | | | |
|---|---|---|---|
| 0113206 | 6/1984 | Japan | 416/219 R |
| 0272404 | 9/1992 | Japan | 416/248 |
| 0652099 | 4/1951 | United Kingdom | 416/220 |

*Primary Examiner*—Edward K. Look
*Assistant Examiner*—Mark Sgantzos
*Attorney, Agent, or Firm*—Andrew C. Hess; David L. Narciso

[57] ABSTRACT

The present invention relieves the stress at a fillet of a blade shank using at least one axially extending pocket on the shank near an axially extending fillet of a shank to root interface or a shank to platform interface on a pressure or suction side of the blade and the pocket is axially shorter than the fillet. The stress relief pocket has a radially extending pocket width that is substantially wider than a fillet width between generally axially extending edges of the fillet wherein the pocket width may be several times wider than the fillet width. The wider pocket shields the fillet thereby reducing the stress concentration at the fillet.

22 Claims, 5 Drawing Sheets

STRESS RELIEVING MOUNT FOR AN AXIAL BLADE

BACKGROUND OF THE INVENTION

1. Field of the Invention

This invention relates to the mounting of blades in rotors of axial flow machines and specifically to the shank construction of such blades in gas turbine engines. The invention was developed for use with gas turbine engine compressor rotor blades but has wider applicability to other axial flow machines with rotor blades including but not limited to a turbine.

2. Description of Related Art

A typical compressor rotor assembly of a gas turbine engine has a plurality of rotor blades extending radially outward across a fluid path which in the case of gas turbine engines is usually referred to as the working medium i.e. air for compressors and a hot mixture of air and combustor combustion products for turbines of jet engines. Blades generally comprise an airfoil section mounted radially outward of a blade root section with a platform therebetween which forms a portion of the boundary between the rotor and the working medium. A shank depends radially inward from the platform to the root. The blade is normally mounted in the rim of a rotor disk by its root interlockingly engaging a slot cut in the rim. One type of turbine blade roots are conventionally angular or curvilinear in form and referred to as dovetail roots and the matching conforming slots as dovetail slots. Formed between the slots are posts in the rim of the disk which may have a radially outer surface forming another portion of the flowpath boundary. Other designs have platforms which extend tangentially from the blade in a generally circumferential direction and adjacent platforms of circumferentially adjacent blades abut each other to a radially outer surface of the disk assembly thereby forming a portion of the flowpath boundary.

High rotational rotor speeds produce high radially oriented centrifugal forces which induce stresses in the rotors and blades which can lead to blade failure. A phenomena often found in rotating structures is aerodynamically induced resonance which causes blades to resonate in their flexural modes (1st, 2nd, etc) causing high cycle fatigue which can also lead to eventual failure of the blade. Conventionally designed blades have shank thicknesses that are limited in their thinness by these factors. Conventional fillets are used above the pressure face of the root at root-to-shank interfaces and at platform-to-shank interfaces to reduce stress concentration effects (Kt). The large a fillet radius is the lower the stress concentration effect it has. However the fillet radius is limited by the two important factors. The first is the effective cross-sectional strength of the blade at the fillet which resists the centrifugal force to which the blade is subjected. The second is the resonant frequency requirements and criteria that have to be met.

One example of this is that the first flex resonant frequency of a first stage compressor blade (nearly always the first vibratory resonant frequency) must be higher than the second harmonic of the 1 per rev frequency of the engine. The reason for this is that inlet distortion into the engine can cause the blade to see two pressure pulses each time the blade travels through one rotation, if this 2 per rev excitation frequency coincides with the first flex frequency of the blade vibratory problems can result. The first flex frequency of a blade can be raised in two basic ways. Reducing the overhung mass of the blade or by increasing the stiffness of the root/dovetail of the blade. When the overhung mass of the blade cannot be reduced or reduced enough to get the required frequency then the width of the shank must be designed wide enough to do so at the expense of the blade shank to pressure face fillet radii. This results in stress problems in this radius. Therefore there exists a need to allow this stress to be reduced without significantly effecting the stiffness of the dovetail and hence the first flex frequency.

High performance turbo-machinery design techniques often attempt to maximize the number of blades for any particular rotor stage thus causing design concerns relative to the amount of circumferential room to fit the blades. This may cause a problem to arise on an axial blade shank of such design where fillet contours at the "root to shank" interface and at the "platform to shank" interface become highly stressed due to increased section stresses in the shank as compared to more conventionally designed blades. The increased level of stresses is caused by relatively low shank thickness to minimize circumferential space combined with geometric fillet stress concentration effects (Kt).

In today's modern compressors there is a design trend towards high efficiency blades with lower aspect ratio blading with high airfoil solidity. This can lead, particularly in the first stage of a compressor, to a design in which there is insufficient circumferential space to install blade dovetails and disk posts that meet all the structural design requirements even if the axial length of the dovetail is equal to the root chord of the airfoil. The problem is that with many dimensions set, the stress at the shank to root interface above the pressure face of the root may be too high. Typically this stress is localized because of the geometry of the airfoil. Therefore there exits a need to reduce the stress concentration locally in the shank interface sections of the blade without significantly changing the blade shank width which is set based on other criteria such as the blade's first flex frequency.

SUMMARY OF THE INVENTION

Therefore in order to provide a means to relieve the stress at the fillet of a blade shank the present invention provides at least one axially extending, and axially elongated pocket on the shank near an axially extending fillet of a shank to root interface or a shank to platform interface on a pressure or suction side of the blade and the pocket is axially shorter than the fillet. The stress relief pocket has a radially extending pocket width that is substantially wider than a fillet width between generally axially extending edges of the fillet. In one particular embodiment the pocket width is several times wider than the fillet width. A more particular embodiment provides the stress relief pocket with a generally axially extending curvilinear cross-section which may have two arc shaped sub-sections with a flat sub-section therebetween, the arc shaped sub-sections delimited by two pocket arc radii RP1 and RP2 and having two respective spaced apart center of curvatures from which the respective pocket arc radii RP1 and RP2 correspondingly extend to the pocket cross-section. A another embodiment of the invention disposes the pocket over a generally axially extending section of the shank coinciding with a predetermined area of high stress on the pressure side of the blade at the blade root to shank interface while a more particular embodiment centralizes the pocket about an axial position of a generally maximum airfoil thickness of the airfoil. The present invention may be used on turbine blades and fan blades as well as compressor blades and on blades without platforms as well.

ADVANTAGES

Among the advantages provided by the rotor blade damping assembly of the present invention is the ability to design and operate a rotor with a great many blades without the blades coming apart or failing due to centrifugal force loads or high frequency resonance induced stresses in blade shank fillets. Another advantage provided by the present invention is a means to reduce stress concentrations along a shank to root interface or a shank to platform interface on a pressure or suction side of a blade thus allowing design and construction of more efficient gas turbine engines and rotating machinery.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
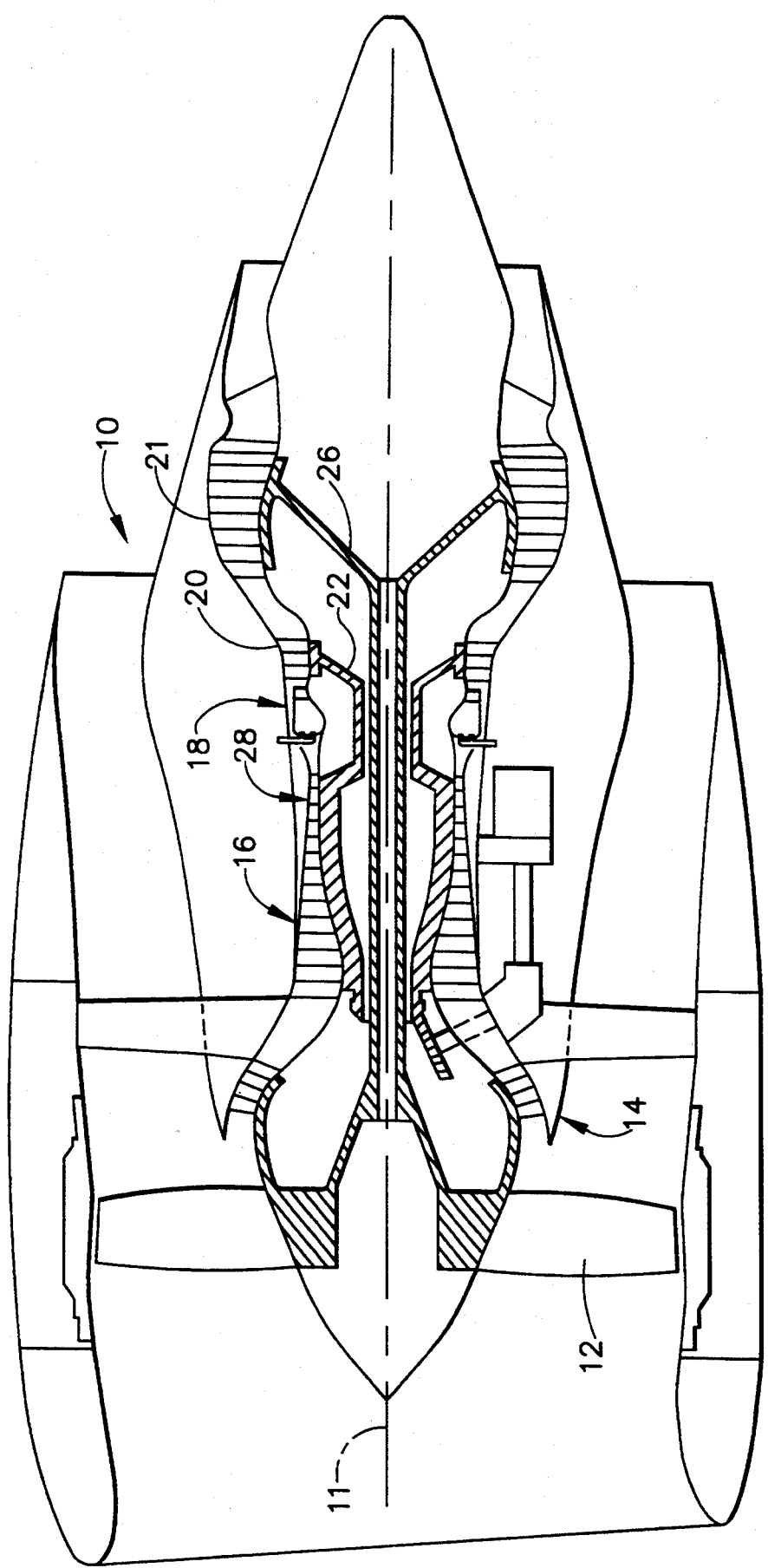
FIG. 1 is a cross-sectional view of a gas turbine engine turbine having a high pressure compressor (HPC) first stage blade and mount assembly in accordance with the present invention.

Illustrated in FIG. 1 is a gas turbine engine 10 circumferentially disposed about an engine centerline axis 11 and having in serial flow relationship a fan section, indicated by fan blades 12, a low pressure compressor 14, a high pressure compressor 16, a combustion section 18, a high pressure turbine 20, and a low pressure turbine 21. The combustion section 18, high pressure turbine 20, and low pressure turbine 21 are often referred to as the hot section of the engine 10. A high pressure rotor shaft 22 connects, in driving relationship, the high pressure turbine 20 to the high pressure compressor 16 and a low pressure rotor shaft 26 drivingly connects the low pressure turbine 21 to the low pressure compressor 14 and the fan section indicated by the fan blades 12. Fuel is burned in the combustion section 18 producing a very hot gas mixture which is flowed to the high pressure and low pressure turbines 20 and 21, respectively to power the engine 10. The high pressure rotor shaft 22 together with the high pressure turbine 20 and the high pressure compressor 16 form a high pressure engine rotor 28.

Figure 2:
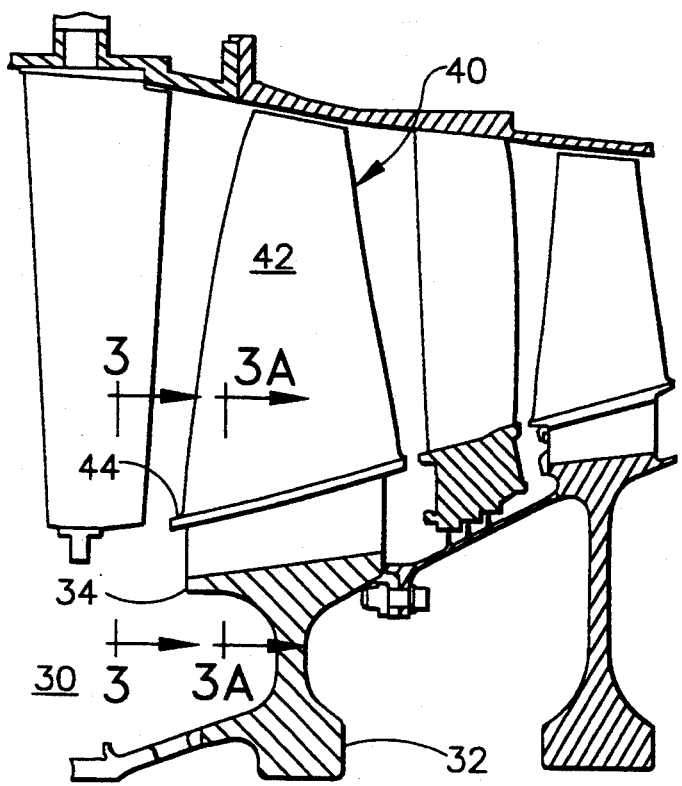
FIG. 2 is an enlarged cross-sectional view of the first stage rotor and its blade and mount assembly illustrated in FIG. 1.
Figure 3:
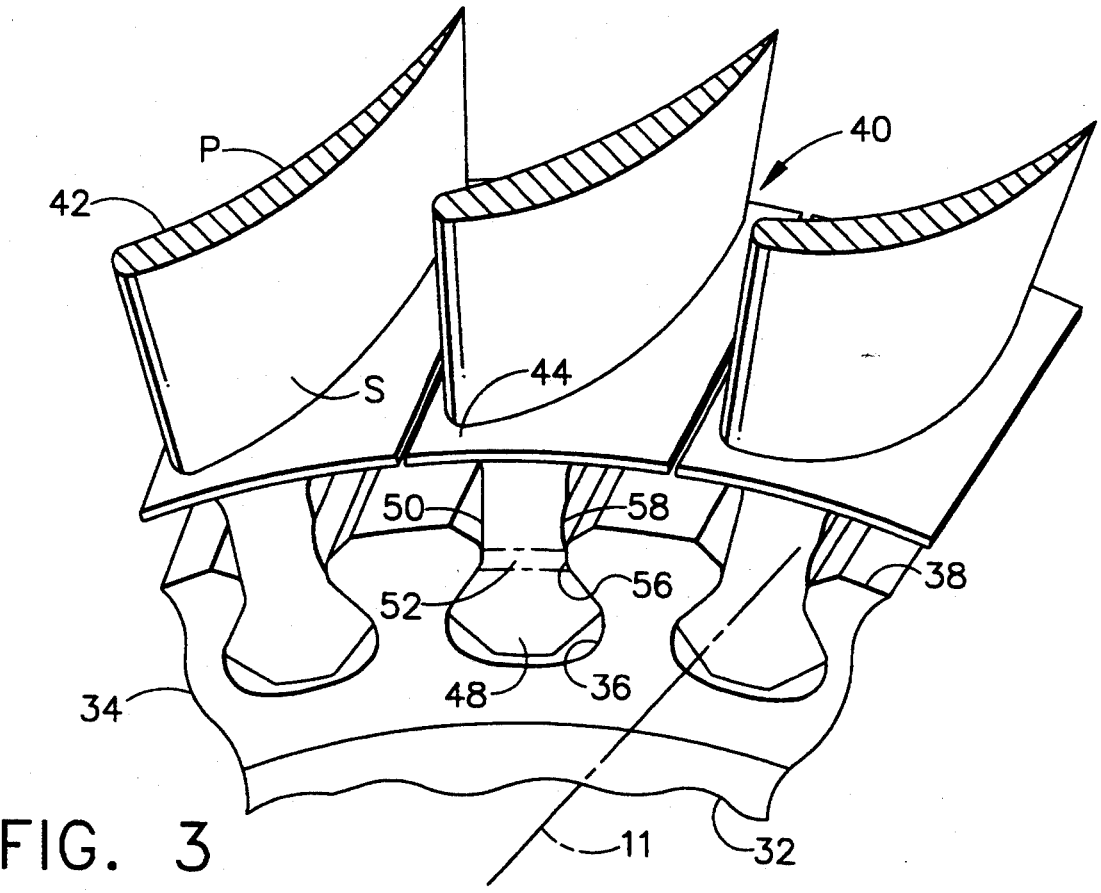
FIG. 3 is a perspective view of the first stage blade and mount assembly through 3—3 in FIG. 2.
Figure 3A:
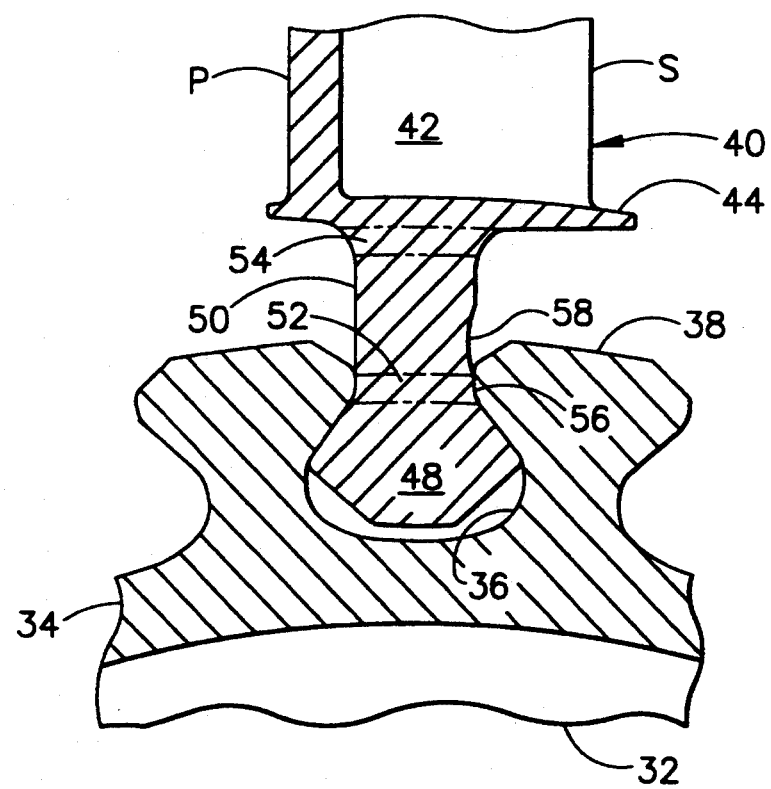
FIG. 3A is a cross-sectional view of the first stage blade and mount assembly through 3A—3A in FIG. 2.

Referring to FIGS. 2, 3 and 3A, a portion 30 of the gas turbine engine rotor 28 (in FIG. 1) has a first stage high pressure compressor disk 32 including a circumscribing rim 34 with a plurality of circumferentially disposed generally axially extending blade slots 36, in the form of dovetail slots, cut therethrough forming dovetail posts 38 therebetween. Note that blade slots 36 are often not cut exactly parallel to the engine's centerline axis 11 but may be somewhat angled in the circumferential direction for dynamic and structural reasons. Such a minor skewing of the slots 36 blade components aligned with the slots and their direction and/or orientation, with respect to the centerline axis 11, are considered generally axially extending for the purpose of this patent application.

A preferably integrally formed compressor blade 40 having a pressure side P and a suction side S is securingly disposed in the dovetail slot 36. An airfoil 42 extends radially outward from and generally axially along a blade platform 44 and is coextensive with a portion of the pressure side P and a portion of the suction side S of the blade 40. A blade root 48 is connected to the platform 44 by a blade shank 50. Referring more particularly to FIG. 3A, the root 48 is connected to the shank 50 along a region referred to as a root to shank interface 52 and the platform 44 is connected to the shank along a region referred to as a platform to shank interface 54. Generally axially extending fillets 56 on the pressure side P, as illustrated in FIG. 4A, and the suction side S, as illustrated in FIG. 4, of the blade 40 are formed along the root to shank interface 52.

A generally axially extending, and axially elongated stress relief pocket 58 is formed in the shank 50 on the suction side S of the blade 40 near one corresponding fillet 56. The pocket 58 is axially shorter than the fillet 56 as illustrated in FIG. 4. Other embodiments of the present invention include the use of correspondingly oriented fillet and stress relief pocket sets on the pressure and suction sides along both of the interfaces and either individually or in combination, i.e. a set on the either or both the suction or pressure sides of the blade along the root to shank interface 52 and another set on either or both of the pressure and suction sides of the blade along the platform to shank interface 54.

Figure 4:
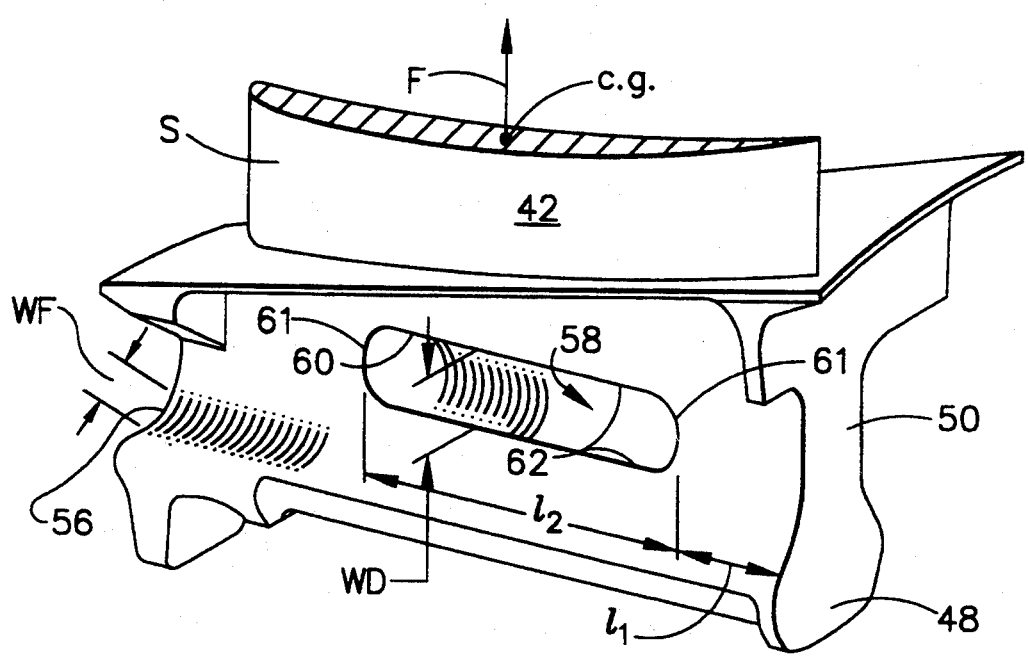
FIG. 4 is a perspective view of the first stage blade in FIGS. 2, 3, and 3A in accordance with an exemplary embodiment of the present invention.
Figure 4A:
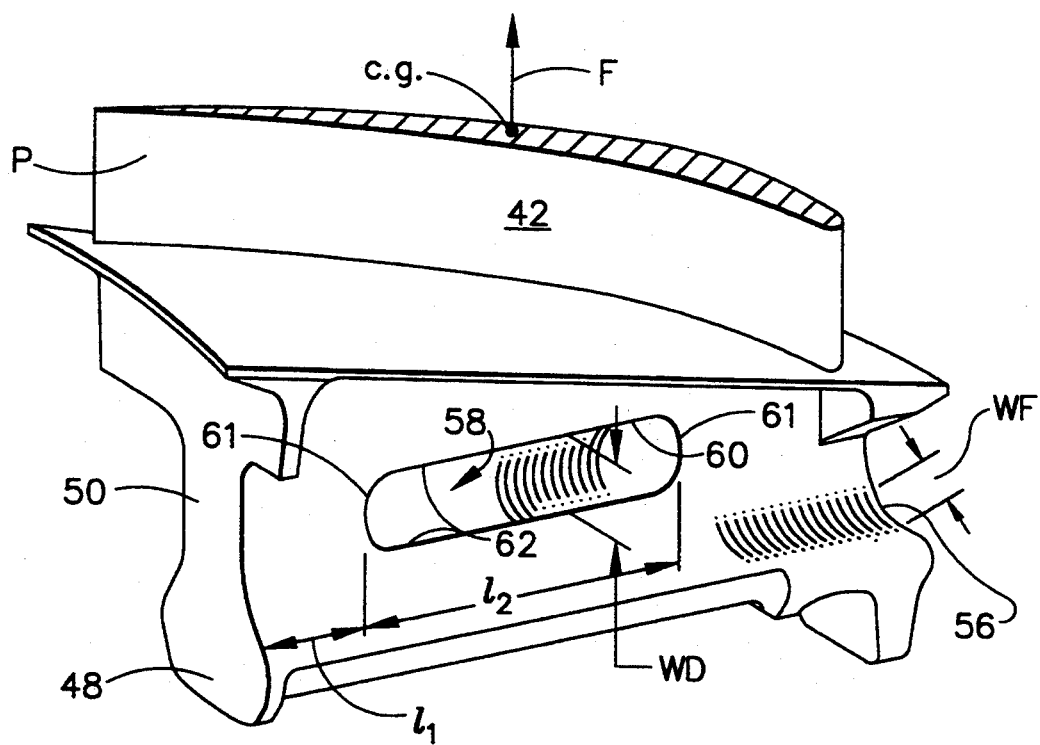
FIG. 4A is a perspective view of the pressure side of the first stage blade in FIGS. 2, 3 and 3A in accordance with an embodiment of the present invention.

Still referring to FIG. 4, the stress relief pocket 58 is formed in the shank 50 on the suction side S of the blade 40 near a location of a predetermined area of high stress on the blade shank 50. This typically occurs along a fillet 56 and often at an axial position of the radial line of force F of the blade. The forces effecting the blade are predominantly centrifugal loads which act through a center of gravity cg of the airfoil 42 and are transferred into the blade shank 50. Due to the camber of the airfoil 42, the load is non-uniformly transferred into the blade shank causing high stress in the portion of the shank 50 which supports the airfoil. Therefore the stress relief pocket 58 is axially centered about and with respect to an axial portion of the blade shank 50 which supports the centrifugal load due to the airfoil 42 which in the exemplary embodiment in FIG. 4 is near the cg of the airfoil 42.

Figure 5:
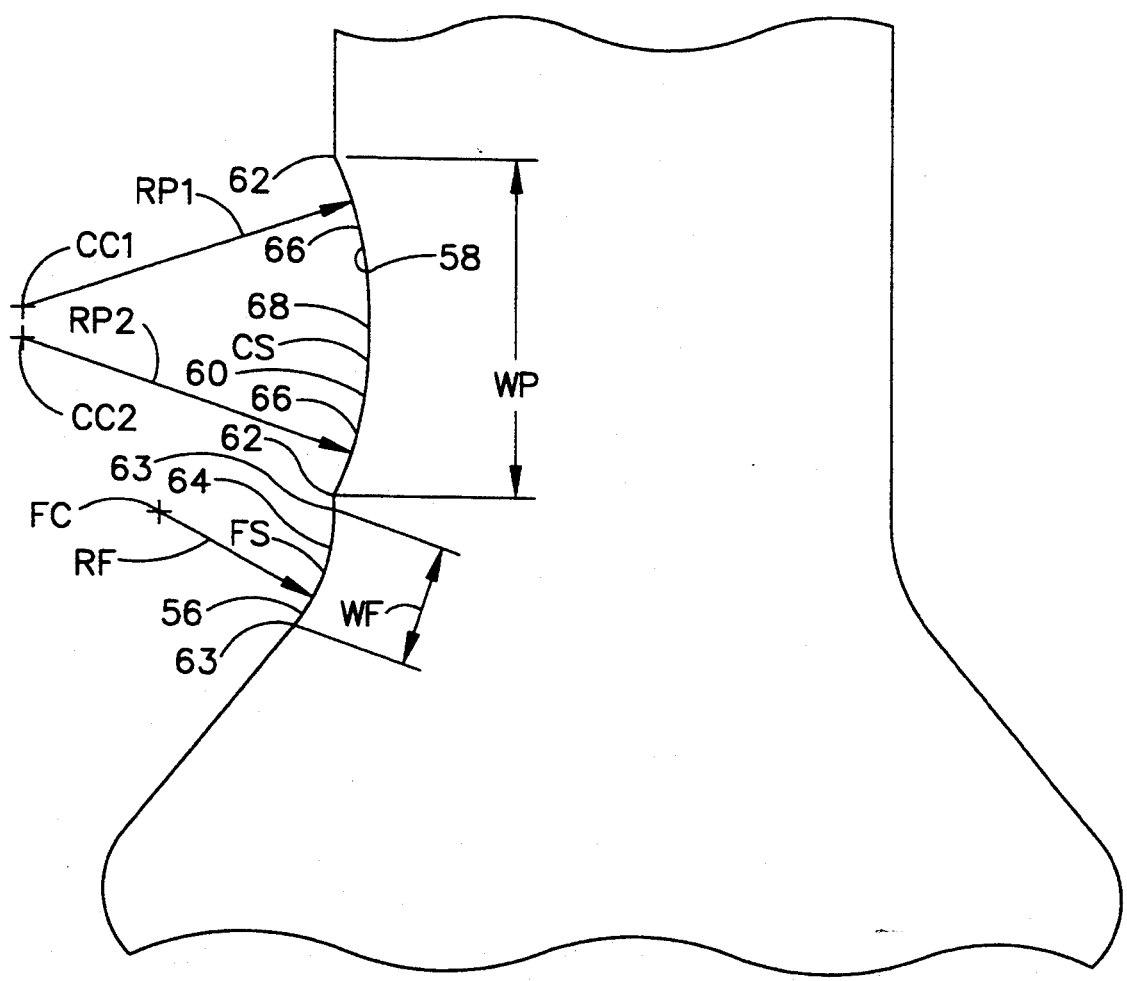
FIG. 5 is an enlarged cross-sectional view of shank and root portions of the first stage blade in FIG. 3A.

The stress relief pocket 58 is a depression or hollow in the surrounding surface so that by definition it has a continuous perimeter around the depression or hollow that marks a boundary between the depression and the surrounding surface which, for the present invention, is the surface of the shank 50 along the pressure side or suction side of the blade 40. The exemplary embodiment of the stress relief pocket 58 illustrated herein is disposed a substantial inset length $l_1$ from the axially aft end of the shank 50 and has a substantial pocket length $l_2$ that, though longer than $l_1$ is on the same order of magnitude as $l_1$. The stress relief pocket 58 in FIG. 4 has a generally axially extending, and axially elongated curvilinear cross-sectional channel 60 capped by ends 61. The stress relief pocket 58 and the channel 60 and have a radially extending pocket width WP between generally axially extending edges 62 of the pocket that is substantially wider than a fillet width WF between generally axially extending edges 63 of the fillet 56, as can be seen in FIG. 5. As can be seen in FIGS. 4, 4A and 5, the pocket width WP is on the same order of magnitude as and substantially wider than the fillet width WF. Furthermore, in the preferred embodiment the pocket width WP is several times wider than the fillet width WF. As can be seen in FIGS. 4, 5 and 6, the stress relief pocket 58 radially extends over a portion of the shank 50 and has a pocket width WP that, though wider than the fillet width WF, is on the same order of magnitude as the filler width.

Still referring to FIG. 5, the fillet 56 has a generally axially extending curvilinear shaped cross-section 64 delimiting the surface FS of the fillet, both of which are is arc shaped and delimited by a single fillet arc radius RF having a fillet center of curvature FC. The stress relief pocket 58 has a cross-section with two arc shaped mirror image perimeter sections 66 with a flat section 68 therebetween delimiting the channel surface CS of the channel 60 of the pocket. The arc shaped perimeter sections 66 are delimited by two pocket arc radii RP1 and RP2 having two respective spaced apart pocket centers of curvature CC1 and CC2 from which the respective pocket arc radii RP1 and RP2 correspondingly extend to the channel surface CS. The pocket has a larger effective radius or pocket width WP than the fillet radius or fillet width WF and it basically works to shield the smaller radius with the bigger radius and the net effect is a lower stress concentration.

The fillets and pockets of the present invention are somewhat narrow or are axially elongated such that their respective lengths are at least several times greater than their respective widths as shown in FIGS. 3, 4 and 4A.

While the preferred embodiment of the invention has been described fully in order to explain its principles, it is understood that various modifications or alterations may be made to the preferred embodiment without departing from the scope of the invention as set forth in the appended claims. The present invention may be used on turbine blades and fan blades and on blades without platforms.

We claim:

1. A rotor blade comprising:
a pressure side and a suction side,
an airfoil extending radially outward from and generally axially along a blade platform and coextensive with a portion of said pressure side and a portion of said suction side,
a blade root connected to said platform by a blade shank,
said blade root connected to said blade shank at a blade root to shank interface and said platform connected to said blade shank at a platform to shank interface,
a generally axially extending fillet on said blade along at least one of said interfaces,
a generally axially extending stress relief pocket formed in a surface of said shank near said fillet,
said pocket having a pocket width between generally axially extending edges of said pocket,
said pocket width extending radially along only a portion of said shank and aid pocket width being less than a distance between said blade root to shank interface and said platform, and,
said pocket being axially shorter than said fillet.

2. A rotor blade as claimed in claim 1, wherein said fillet has a fillet width between generally axially extending edges of said fillet and said pocket width is wider than said fillet width and is on the same order of magnitude as the fillet width.

3. A rotor blade as claimed in claim 2, wherein said pocket width is several times wider than said fillet width.

4. A rotor blade as claimed in claim 3, wherein said stress relief pocket has a generally axially extending curvilinear cross-section.

5. A rotor blade as claimed in claim 3, wherein;
said fillet has a generally axially extending curvilinear shaped cross-section that is arc shaped and delimited by a single fillet arc radius _(RF)_,
said pocket cross-section has an two arc shaped sub-sections with a flat sub-section therebetween, and
said arc shaped sub-sections delimited by two pocket arc radii _(RP1)_ and _(RP2)_ and having two respective spaced apart center of curvatures from which said respective pocket arc radii _(RP1)_ and _(RP2)_ correspondingly extend to said pocket cross-section.

6. A rotor blade as claimed in claim 3, wherein said pocket is disposed over a generally axially extending section of said shank coinciding with a predetermined area of high stress on said pressure side at said blade root to shank interface.

7. A rotor blade as claimed in claim 5, wherein said pocket is disposed over a generally axially extending section of said shank coinciding with a predetermined area of high stress on said pressure side at said blade root to shank interface.

8. A rotor blade as claimed in claim 6, wherein said section of said shank is centralized about an axial position of a generally maximum airfold thickness of said airfold.

9. A rotor blade and disk assembly for use in a gas turbine engine, said rotor blade and disk assembly comprising:
a plurality of rotor blades having dovetail blade roots disposed in a corresponding plurality of dovetail slots cut in a gas turbine rotor disk,
each of said blades comprising;
a pressure side and a suction side and an airfoil extending radially outward from and generally axially along a blade platform and coextensive with a portion of said pressure side and a portion of said suction side,
one of said dovetail blade root connected to said platform by a blade shank,
said blade root connected to said blade shank at a blade root to shank interface and said platform connected to said blade shank at a platform to shank interface,
a generally axially extending fillet on said blade along at least one of said interfaces, a generally axially extending and generally axially elongated stress relief pocket formed in a surface of said shank near said fillet, said pocket being axially shorter than said fillet, and wherein said stress relief pocket has a radially extending pocket width between generally axially extending edges of said pocket, said pocket width extending radially along only a portion of said shank and said pockets width being less than a distance between said blade root to shank interface and said platform, said fillet has a fillet width between generally axially extending edges of said fillet, and said pocket width is wider than said fillet width and is on the same order of magnitude as the fillet width.

10. A rotor blade and disk assembly as claimed in claim 9, wherein said pocket is disposed over a generally axially extending section of said shank coinciding with a predetermined area of high stress on said pressure side at said blade root to shank interface.

11. A rotor blade and disk assembly as claimed in claim 10, wherein;

said fillet has a generally axially extending curvilinear shaped cross-section that is arc shaped and delimited by a single fillet arc radius $(RF)$, said pocket cross-section has an two arc shaped sub-sections with a flat sub-section therebetween, and said arc shaped sub-sections are delimited by two pocket arc radii $(RP1)$ and $(RP2)$ and having two respective spaced apart center of curvatures from which said respective pocket arc radii $(RP1)$ and $(RP2)$ correspondingly extend to a surface of said pocket.

12. A rotor blade and disk assembly as claimed in claim 11, wherein said pocket is disposed over a generally axially extending section of said shank coinciding with a predetermined area of high stress on said pressure side at said blade root to shank interface.

13. A rotor blade and disk assembly as claimed in claim 12 wherein said section of said shank is centralized about an axial position of a generally maximum airfoil thickness of said airfoil.

14. A rotor blade and disk assembly as claimed in claim 13 wherein said plurality of rotor blades and gas turbine rotor disk are disposed in a first stage of a high pressure compressor of the gas turbine engine.

15. A rotor blade comprising:

a pressure side and a suction side, an airfoil extending radially outward and generally axially aftwards and coextensive with a portion of said pressure side and a portion of said suction side, a blade root connected to said airfoil by a blade shank, said blade root connected to said blade shank at a blade root to shank interface, at least one generally axially extending fillet on said blade along said interface on at least one of said sides, a generally axially extending stress relief pocket formed in a surface of said shank near said fillet, said pocket having a pocket width between generally axially extending edges of said pocket, said pocket width extending radially along only a portion of said shank and said pocket width being less than a distance between said blade root to shank interface and said platform, and said pocket being axially shorter than said fillet.

16. A rotor blade as claimed in claim 15, wherein said pocket width is wider than a fillet width between generally axially extending edges of said fillet and is on the same order of magnitude as the fillet width.

17. A rotor blade as claimed in claim 16, wherein said pocket width is several times wider than said fillet width.

18. A rotor blade as claimed in claim 17, wherein;

said fillet has a generally axially extending curvilinear shaped cross-section that is arc shaped and delimited by a single fillet arc radius $(RF)$, said pocket cross-section has an two arc shaped sub-sections with a flat sub-section therebetween, and said arc shaped sub-sections delimited by two pocket arc radii $(RP1)$ and $(RP2)$ and having two respective spaced apart center of curvatures from which said respective pocket arc radii $(RP1)$ and $(RP2)$ correspondingly extend to said pocket cross-section.

19. A rotor blade as claimed in claim 17, wherein said pocket is disposed over a generally axially extending section of said shank coinciding with a predetermined area of high stress on said pressure side at said blade root to shank interface.

20. A rotor blade as claimed in claim 17, wherein said section of said shank is centralized about an axial position of a generally maximum airfoil thickness of said airfold.

21. A rotor blade comprising:

a pressure side and a suction side, an airfoil extending radially outward and generally axially aftwards and coextensive with a portion of said pressure side and a portion of said suction side, a blade root connected to said airfoil by a blade shank, said blade root connected to said blade shank at a blade root to shank interface, at least one generally axially extending fillet on said blade along said interface on at least one of said sides, a generally axially extending stress relief pocket formed in a surface of said shank near said fillet, said pocket having a pocket width between generally axially extending edges of said pocket, said pocket width extending radially along only a portion of said shank and said pocket width being less than a distance between said blade root to shank interface and said platform, said pocket having an axially extending first length that is longer than said pocket width and less than a second length of said fillet, and said fillet has a fillet width between generally axially extending edges of said fillet and said pocket width is wider than said fillet width and is on the same order of magnitude as the fillet width.

22. A rotor blade as claimed in claim 20, wherein said pocket is located an inset length from an axially aft end of said shank and said inset length has the same order of magnitude as said axially extending first length of said pocket.

* * * * *